United States Patent

Pozzini et al.

Patent Number: 5,622,026
Date of Patent: Apr. 22, 1997

[54] WELDING AND CUTTING DEVICE FOR FILM-WRAPPED PACKAGING

[75] Inventors: Elio Pozzini, Milan; Giuseppe Fioravanti, Bosisio Parini; Alessandro Ferrari, Cantù, all of Italy

[73] Assignee: Record S.p.A., Italy

[21] Appl. No.: 407,206

[22] Filed: Mar. 20, 1995

[30] Foreign Application Priority Data

Mar. 24, 1994 [IT] Italy .............................. MI94A-0560

[51] Int. Cl.⁶ .................................................. B65B 57/00
[52] U.S. Cl. .......................................... 53/75; 53/374.4
[58] Field of Search ....................... 53/75, 374.4, 371.4; 156/358, 359, 582

[56] References Cited

U.S. PATENT DOCUMENTS

| | | | |
|---|---|---|---|
| 4,549,386 | 10/1985 | Wilson | 53/374.4 |
| 4,712,357 | 12/1987 | Crawford et al. | 53/75 |
| 4,786,353 | 11/1988 | Templeton et al. | 156/359 |
| 4,924,657 | 5/1990 | Berti et al. | 53/75 |
| 5,329,745 | 7/1994 | Suga | 53/75 |

*Primary Examiner*—John Sipos
*Assistant Examiner*—Gene L. Kim
*Attorney, Agent, or Firm*—Kirschstein et al.

[57] ABSTRACT

Welding and cutting device, for film-wrapped packaging, includes two rotary shafts, both of which are fitted with radially projecting plates which, at their free ends, carry plates for cutting and welding the film, in which device each end of an actuating shaft with its respective welding and cutting plates is supported by the arm of a rocking lever which can pivot about a fulcrum integral with the structure of the machine, and the end of the other arm of the rocking lever is connected to components for positioning and for regulating a contrasting force, which components can be set while the machine is operating.

10 Claims, 6 Drawing Sheets

WELDING AND CUTTING DEVICE FOR FILM-WRAPPED PACKAGING

BACKGROUND OF THE INVENTION

The present invention relates to a welding and cutting device for film-wrapped packaging.

Various types of packaging machines exist on the market which, using the flow wrap or flow pack process, wrap the objects to be packaged in a thin film. The film which is wrapped around the products to be packaged is joined in the longitudinal direction by welding together the overlapping edges of the film which, together with the products wrapped in this way, is conveyed along a horizontal plane toward a transverse welding and cutting unit.

The known welding unit basically consists of two horizontal shafts, each shaft being fitted with one or more plates which project radially and in opposite directions and carry means for welding and means for cutting the film. In the following text reference will be made to double plates but, needless to say, the invention may also be applied using a greater number of radially projecting plates.

The transverse welding and cutting of the packaging film takes place each time the free ends of two plates meet above and below the film to be welded and cut during the rotary motion of the supporting shafts.

Depending on the product to be packaged, wrapping films with different technical characteristics are used. Thus, the temperature at which the films can be welded, the size of the films and their tear strength, in addition to the thickness of the films used, which can range for example between 20 and 100μ, all vary in each individual case. In addition, the temperature to which the plates are heated during closure and welding of the packages also needs to be varied, these temperatures ranging approximately from 50° to 250° C. The temperatures selected depend on the contact time between the plates and the film, i.e. on the production rate.

In order to produce perfect packages and reduce rejects and waste to a minimum, it is vital that the rotating shafts and the plates for welding and cutting the film are mounted precisely parallel with one another, even in cases of inevitable thermal expansion, which occurs as a result of the different heating temperatures.

Moreover, an extremely accurate distance needs to be set between the welding and cutting plates, this distance depending on the type of film, the film thickness and the thermal expansion of the mechanical devices. The setting of this distance also depends on the cutting position which needs to be generated between the blade and the counterblade of the welding plates.

Therefore, in known machines it was hitherto vital, before the start of production, to carry out laborious manual setting operations on the basis of the film used, accurately positioning the ends of the rotary shafts which support the welding and cutting plates. In addition, it was necessary to perform laborious manual adjustments on screws and springs, in order to set the desired coupling pressure and distance between the welding plates, so as to avoid excessive cuts in the film in its transverse welding zone.

It is obvious that these very delicate operations, which are needed to set the coupling distance between the welding and cutting plates and to set the pressure exerted on the film by the welding elements and the cutting blades, are fundamental to the efficient operation of the machine, which is designed for continuous and high-speed production.

In the case of machines of the prior art, these setting operations had hitherto to be performed by an experienced operator each time there was a change in production requiring a different type of film or varying the production rate, at which point the operator would have to set the temperature of the rotary welding plates appropriately. Moreover, it was necessary to set the coupling distance between the welding and cutting plates by hand, which operations, on account of the need to carry out numerous trial attempts, led to lengthy and undesired machine stoppages.

It should be emphasized that in the known machines, for reasons of safety and as a result of constructional characteristics, all setting operations had to be carried out while the machine was stopped, a fact which considerably affected the productivity of the whole production plant.

SUMMARY OF THE INVENTON

The object of the present invention is to overcome the disadvantages of the prior art and to propose a welding and cutting device of the type described, which enables a straightforward and accurate setting of the film welding and cutting parameters, which allows a clear display of the values set and which in particular enables the operations of setting the welding and cutting unit to be carried out immediately in case of need, while the production plant is kept in operation and the welding and cutting device continues to rotate.

This object is achieved with a welding and cutting apparatus for a film-wrapped package, comprising two rotary shafts, both of which are fitted with radially projecting plates which, at their free ends, carry means for welding and cutting the film, wherein each end of a shaft supporting its respective welding and cutting plates is supported by the arm of a rocking lever able to pivot about a fulcrum integral with the structure of the machine and wherein the end of the other arm of each rocking lever is connected to controllable positioning means and to a reaction device.

Therefore, by actuating the rocking levers, it will be possible to bring together or move apart the welding and cutting edges or corners of the rotary plates, thereby allowing adjustment according to the thickness of the material to be welded.

BRIEF DESCRIPTION OF THE DRAWINGS

The subject which forms the underlying concept of the present invention will now be described in greater detail by means of an illustrative embodiment which is given solely by way of example and is illustrated in the appended drawings, in which.

DETAILED DESCRIPTION OF THE PREFERRED EMBODIMENT

Figure 1:
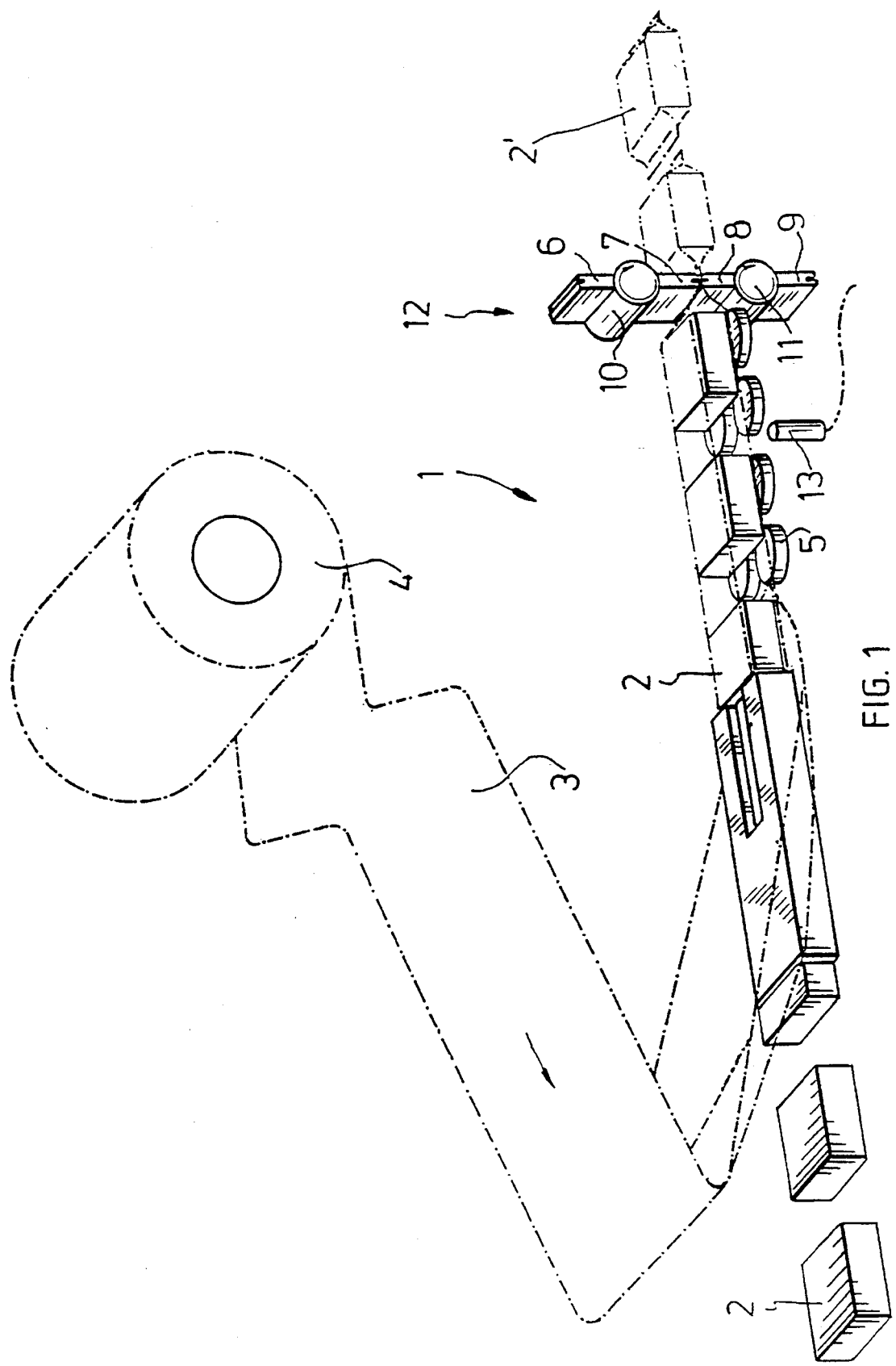
FIG. 1 diagrammatically shows a perspective view of a plant for packaging and welding individual objects, FIG. 2a diagrammatically shows two welding and sectioning plates facing each other, FIG. 2b diagrammatically shows, in cross section, the ends of two transversely welded and cut packages.

As may be seen in FIG. 1, in the packaging machine which is denoted overall by the numeral 1, the products 2 are fed by a horizontal conveyor belt (not shown) and, using a film 3 unwound from a reel 4, the products 2 are wrapped and the subsequently overlapping edges of the film 3 are welded in a longitudinal direction by means of welding rollers 5 which are provided in a subjacent plane.

With the aid of transverse welding and cutting plates, indicated by the numerals 6, 7; 8, 9, supported by shafts 10 and 11 which rotate in a controlled manner, the film 3 wrapped around the articles 2 is welded and cut in a transverse direction, as indicated by dot-and-dash lines 2' in FIG. 1.

Level with the longitudinal welding unit 5, and upstream of the welding device indicated overall by the numeral 12, is provided a sensor element 13 which will be described in greater detail below.

Figure 2A:
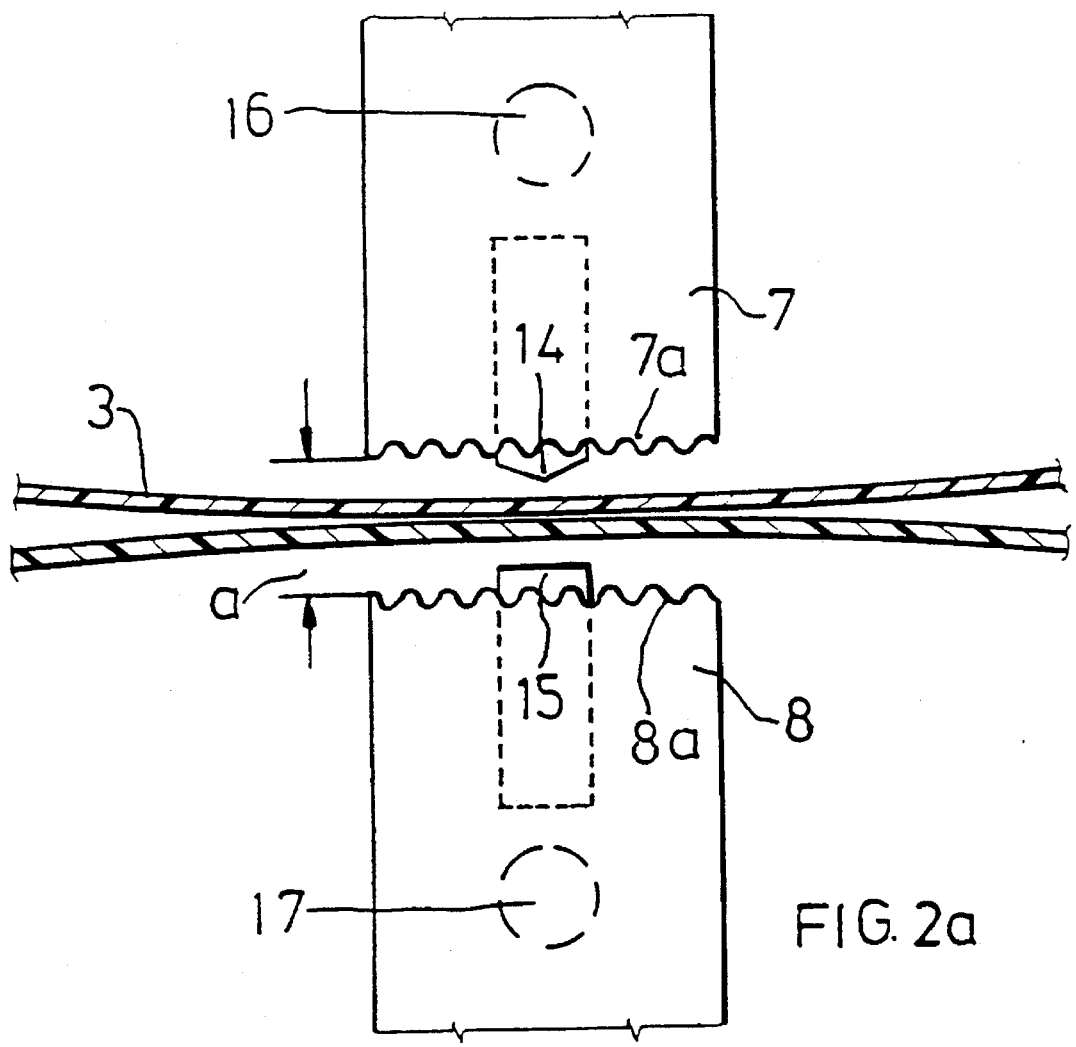

FIG. 2a illustrates two welding and cutting plates 7, 8 during the welding and cutting of the film 3 which forms the tubular wrapping around the products 2. In FIG. 2a, the distance between the ends of the plates 7 and 8 has been exaggerated; in reality, during the welding and cutting stage, the ends of the plates 7 and 8 are virtually in mutual contact.

In order to obtain perfect welding and perfect cutting of the film by means of the blades 14 and 15, it is imperative that the distance (a) be set with the utmost possible accuracy, to within thousandths of a millimeter, and on the basis of the type and thickness of the film 3 and of the speed of advance of the film 3.

The smooth or corrugated surfaces 7a, 8a of the welding and cutting plates 7 and 8 respectively, are heated, for example, by means of heater plugs 16 and 17 which can be heated electrically and are operationally connected in a known way to an adjustable thermostat.

Figure 2B:
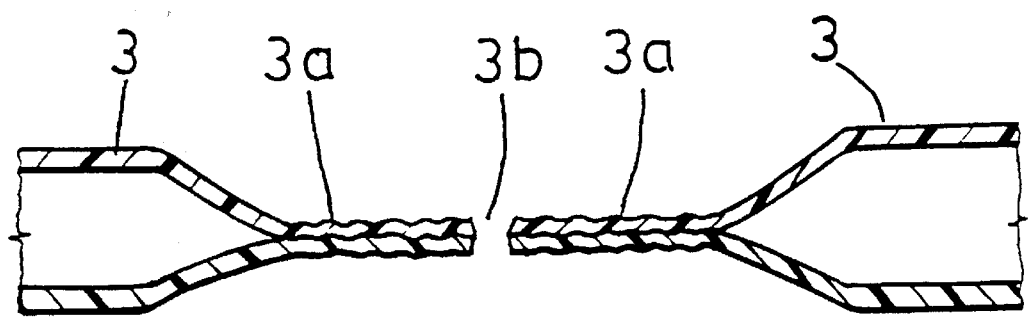

FIG. 2b illustrates, in cross section, the welding zone of the film 3, forming transverse edges 3a and a transverse cut 3b.

Figure 3:
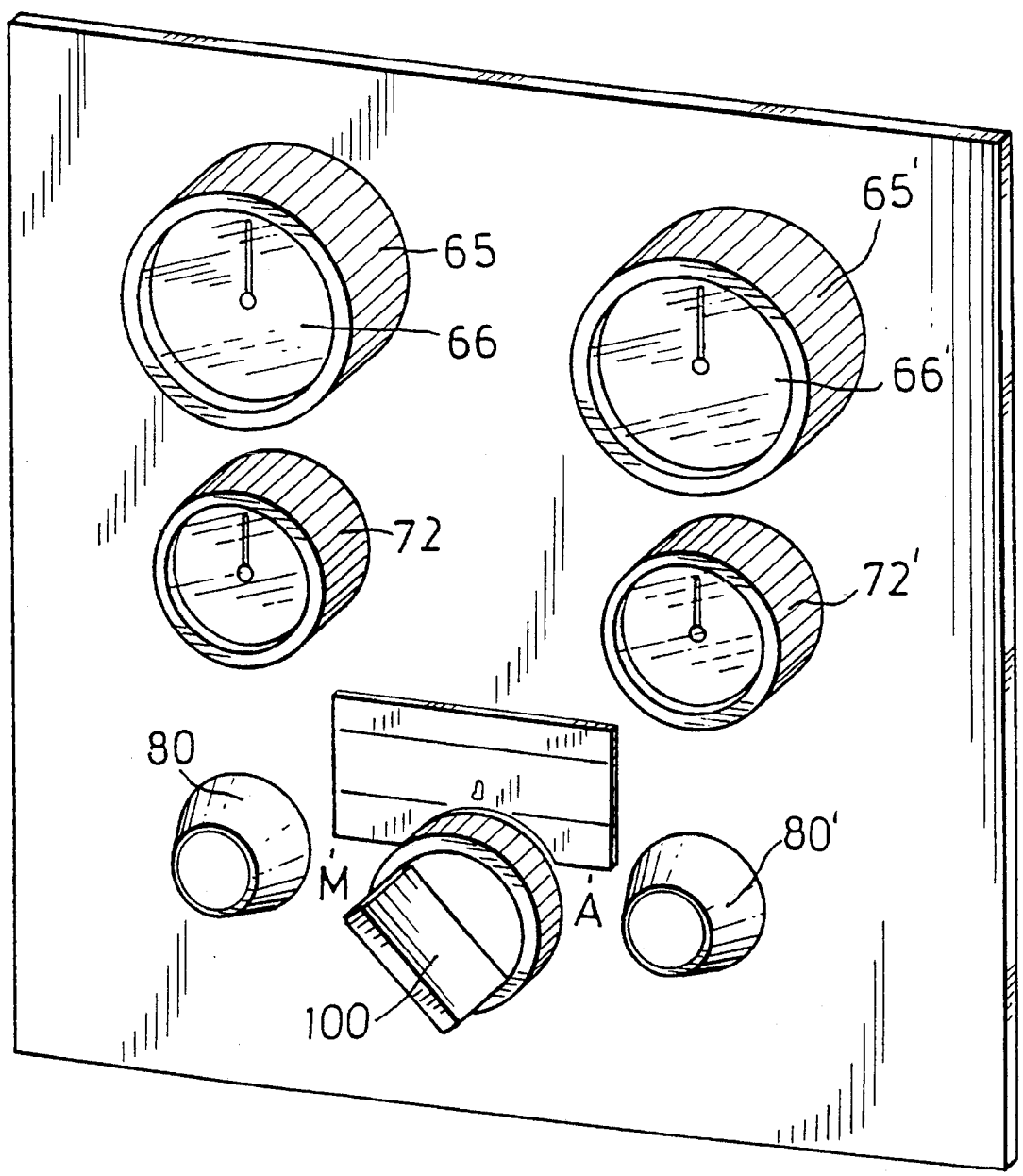
FIG. 3 shows the control panel of the welding device, FIG. 4 diagrammatically shows a perspective view of the essential means of the welding and cutting unit.

FIG. 3 diagrammatically shows a perspective view of the welding apparatus control panel, which is described in greater detail below.

Figure 4:
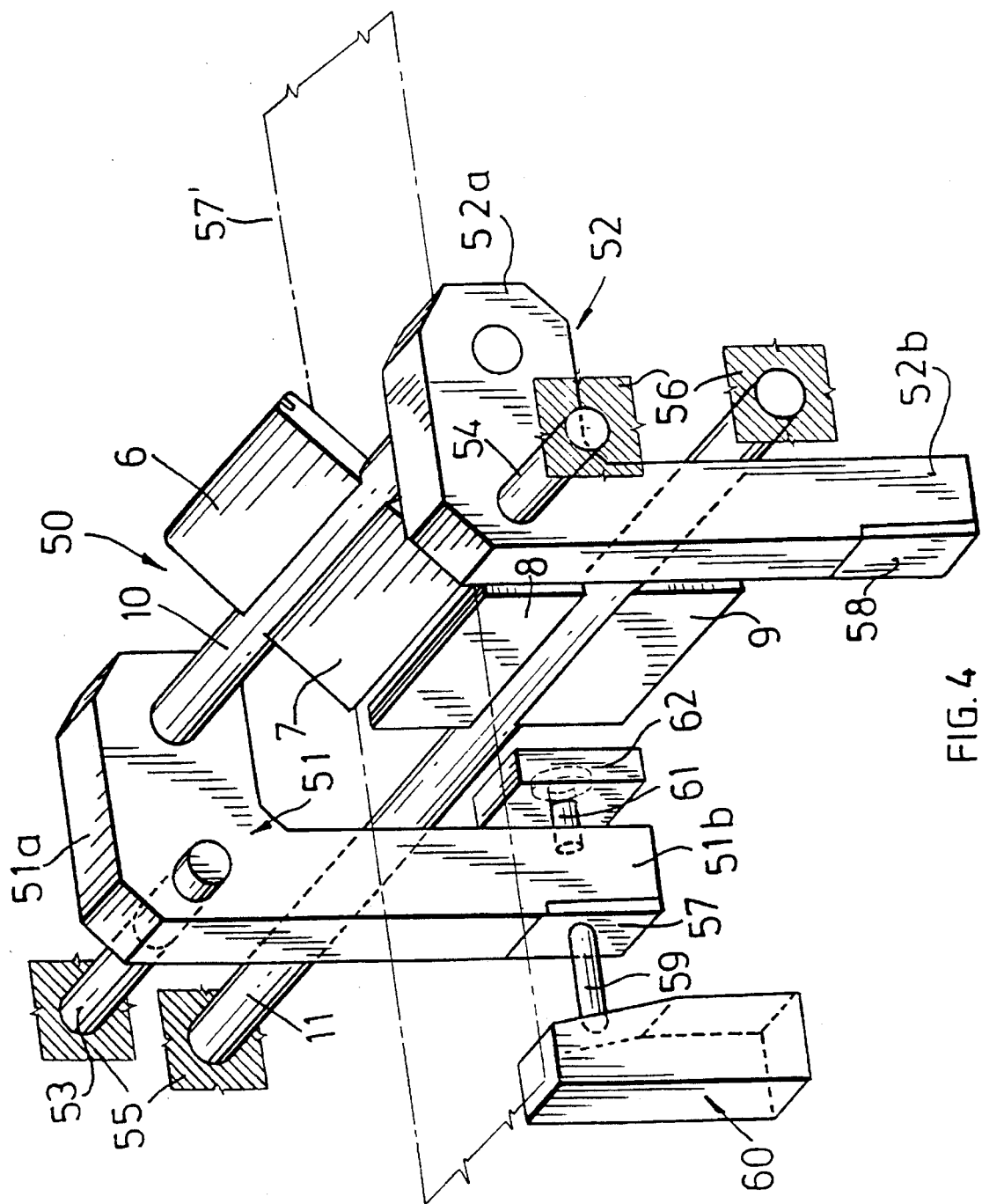

A perspective view of the embodiment of the welding and cutting device, indicated overall by the numeral 50, can be seen in FIG. 4.

The device consists of two arms in the form of rocking levers 51 and 52. The arm 51, via a pin 53, and the arm 52, via the pin 54, are supported so that they can pivot. The pins 53 and 54 are integral with the sides 55 and 56 of the device indicated overall by the numeral 50. The shorter arms 51a and 52a of the rocking lever 51, 52 rotatably carry a shaft 10, from which two or more welding and cutting plates project radially and in opposite directions.

The shaft 11 is mounted rotatably, but integral with the walls 55, 56 of the machine, beneath the shaft 10 and is fitted with the welding plates 8 and 9.

It should be emphasized that, in reality, the shafts 10 and 11 are located in a single common vertical plane; however, in FIG. 4, the shaft 11 with its welding and cutting plates 8, 9 is shown offset with respect to the shaft 10 supporting the welding and cutting plates 6 and 7 for the sake of clarity of illustration.

Indicated diagrammatically in FIG. 4 using dot-and-dash lines is a plane 57' along which are made to advance the products 2 wrapped in the film 3, which film is to be welded and cut by means of the plates 7, 8, and 6, 9, when the free ends of these plates meet during the rotary motion of the shafts 10 and 11. Each rocking lever 51, 52 has a longer arm 51b, 52b, respectively, which projects basically downward. The free end of each arm 51b, 52b has a plane 57, 58 respectively, while a stem 59 engages with each plane, this stem 59 being activated in a controlled manner via a setting device which is indicated overall by the numeral 60.

For reasons of clarity, FIG. 4 only shows the device 60, together with its associated activating stem 59, for the arm 51b only; needless to say, however, a similar device is also slaved to the inclined plane 58 of the second arm 52b which forms part of the second rocking lever 52.

Engaging with the opposite surface of the arm 51b from that with the plane 57 is the rod of a pneumatic piston 61 which is supported by a locally fixed supporting plate. The operation of the piston 61 will be described in greater detail below.

Needless to say, the surface opposite the plane 58 of the arm 52b of the rocking lever 52 also engages with a cylinder and piston unit 61, which has not been illustrated in FIG. 4 for the sake of clarity.

Figure 5:
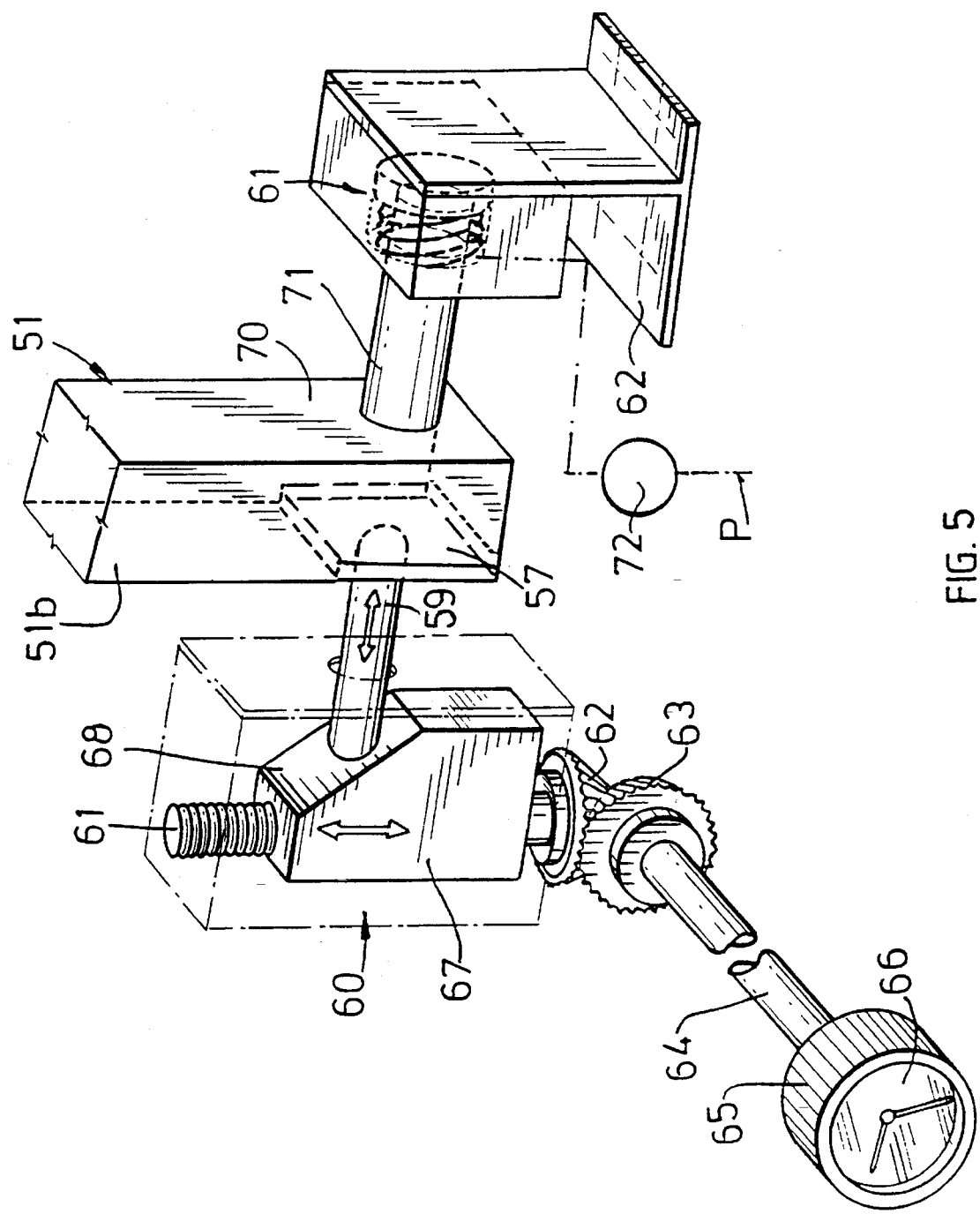
FIG. 5 shows a perspective view of the essential elements for setting the welding and cutting unit.

With reference to FIG. 5, the adjustment and setting unit 60 will be described in grater detail below. This adjustment unit will be described solely and exclusively with respect to the arm 51b of the rocking lever 51; needless to say, an identical device is also slaved to the arm 52b of the rocking lever 52.

As can be seen in FIG. 5, a screw 61 is rotatably supported inside the adjustment device 60, the bottom part of this screw 61 being connected to a bevel gear 62 which meshes with a bevel gear 63 which, by means of an actuating shaft 64 (shown diagrammatically without transmission systems), is attached to an actuating knob 65 on an indicator device 66 fitted with gauge needles.

The screw 61 acts on a control body 67 which is supported inside the device 60. The control body 67, which can be moved in translation, has an inclined plane 68 via which it acts on one end of the actuating stem 59, the other end of this stem resting against the surface 57 of the arm 51b. Engaging with the opposite surface 70 of the arm 51b from that with the plane 57, is a reaction device formed by a stem 71 of a cylinder and piston unit 61 which is supported by a locally fixed plate 62. A pressure regulating gauge 72 is connected to that part of the cylinder 61 which is acted on by a pressurized fluid P.

Figure 6A:
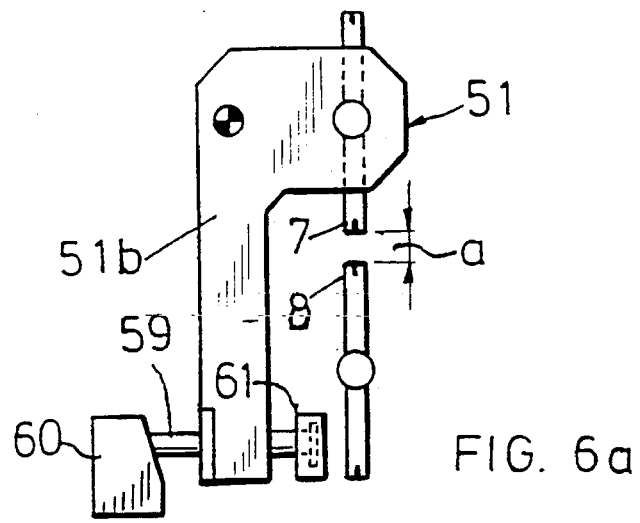
FIGS. 6a, 6b, 6c show side views of the rocking levers and the welding and cutting plates in various positions.
Figure 6B:
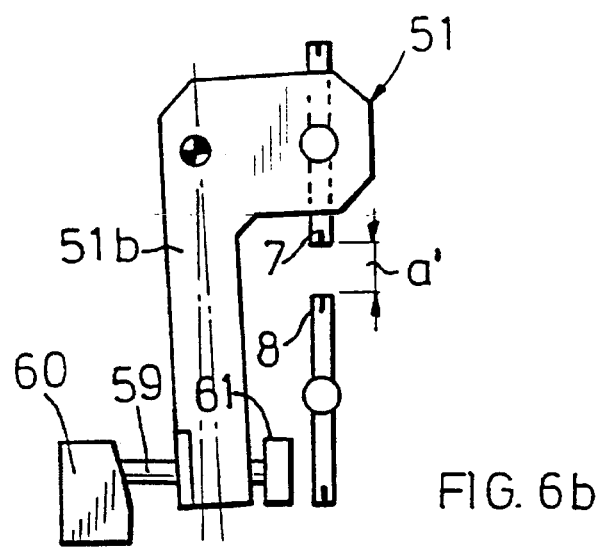
Figure 6C:
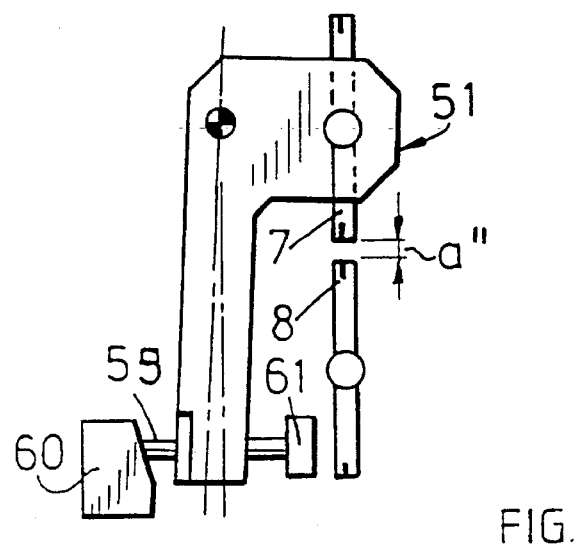

FIGS. 6a, 6b and 6c illustrate the rocking lever 51 in various positions. Obviously, the same conditions of positioning also apply to the rocking lever 52.

In FIG. 6a, the setting stem 59 is shown in a position in which the arm 51b is in an approximately vertical position and the distance between the welding plates 7 and 8 corresponds to an average value indicated by (a). The cylinder and piston unit 61 is stressed at a pressure which has been selected beforehand.

In FIG. 6b, the setting stem 59 projects further out of the device 60 so that the arm 51b of the rocking lever 51 is made to pivot against the force exerted by the cylinder and piston unit 61, into a position which is inclined toward the right, forming a larger gap (a') between the welding and cutting plates 7 and 8.

In FIG. 6c, the stem 59 has been made to move back into the device 60 and therefore, under the action of the cylinder and piston unit 61, the rocking lever 51 is made to pivot toward the left, forming a gap (a") between the opposing welding and cutting plates 7 and 8 which may be considered the minimum gap.

FIG. 3 shows the machine's control panel. In order to be able to set the position of the rocking lever 51 accurately, a knob 65 incorporating an indicator apparatus, for example a position indicator, which shows the precise position of the rocking lever 51 (FIG. 5), is mounted on the control panel.

In order to be able to set the pressure P in the cylinder and piston unit accurately, a pressure gauge 72 is provided in combination with a pressure regulator 80, which is operationally connected to the cylinder 61. The same instruments are present on the panel for the setting of the rocking lever 52; these instruments are indicated by the numerals 65', 66', 72' and 80' and will not be described in further detail since their operation is identical to that of the instruments slaved to the rocking lever 51.

The control panel illustrated in FIG. 3 also has a switch 100 which enables automatic operation or manual operation of the welding unit to be set.

In the event of a product being fed incorrectly to the welding elements and being crushed, creating reject packages, known monitoring means which are provided on the machine will cause production to stop. In such a case the operator switches the switch 100 onto manual which shuts off the pressure (P) so as to allow the welding elements to be opened, thereby enabling him to extract the reject package, clean any parts which may have become soiled, remove the film and place the products to be packaged back into the correct sequence.

The invention also provides for the switch 100 to be switched to "automatic operation".

In automatic operation the sensor 13 illustrated in FIG. 1 is activated and emits signals which indicate whether the product fed in is in the correct conveying position. Should this not be the case, the signals emitted automatically cause the air pressure in the cylinder and piston units 61 to drop to zero temporarily, enabling the rocking levers 51, 52 to be moved into the position illustrated in FIG. 6*b*, thereby allowing the reject packages to pass through without having to stop production in order to carry out the necessary intervention.

The device designed according to the present invention operates in the following way: the distance (a) is adjusted by means of the knob 65, its value being indicated by the display instrument 66. The screw 61 is then activated via the transmission shaft or shafts 64 and bevel gears 62, 63, and the setting body 67 is made to move upward or downward in translation. The inclined plane 68 acts on the stem 59 which, depending on its position, moves the arm 51*b* of the rocking lever 51 into the positions illustrated in FIGS. 6*a*, 6*b*, 6*c*, thereby varying the distance (a) between the welding and cutting plates 7, 8. In this way, the distance (a, a', a") between the plates 7, 8 is adjusted according to the welding and cutting requirements of the film passing through the machine.

So as not to make the rocking levers 51, 52 rigid structures, the surface of the arm 51*b*, opposite the surface 57 against which the stem 69 acts, is in contact with the rod 71 of a cylinder and piston unit 61 into which compressed air is advantageously fed. A pressure gauge 72 and a pressure regulator 80 are slaved to the cylinder 61, thus enabling the reactive force transmitted by the rod 71 to the arm 51*b* to be set in accordance with the type of film used and the thickness of the film passing through the machine.

With the apparatus designed according to the present invention it is therefore possible completely to do away with the manual setting of the distance (a) between the rotary cutting and welding plates. With the invention the distance (a) may be easily adjusted and set on a control panel and, by virtue of the display apparatuses, setting may even be carried out by an inexperienced person following simple working instructions.

These adjustments can be carried out while the machine is running, without having to interrupt the operation of the production line.

We claim:

1. An adjustable welding and cutting device for a film-wrapped packaging machine, comprising:

a) means for advancing a film and a succession of objects to be wrapped with the film along a path;

b) a pair of movable plates located at opposite sides of the film;

c) a pair of welding and cutting means on the plates and movable from an initial position in which the welding and cutting means are spaced apart by a distance, to a final position in which the welding and cutting means are operative for welding and cutting the film therebetween; and d) means for adjusting said distance, including (i) a pair of rocking levers each having first arms for supporting one of the plates, and second arms having opposite sides, said first and second arms of each rocking lever extending perpendicularly relative to each other and meeting at a junction, each rocking lever being mounted for pivoting movement about a pivot axis extending transversely of the path at the junction, and (ii) positioning means bearing against both sides of each second arm, for pivoting the rocking levers and, in turn, said one plate to a desired spacing relative to the other of the plates, said positioning means including an elongated stem having one end engaging one of said sides of the second arm of each lever; and a transmission for advancing the stem in one direction lengthwise thereof to pivot the respective lever in one circumferential direction about the pivot axis, and for retracting the stem in an opposite direction lengthwise thereof to pivot the respective lever in an opposite circumferential direction about the pivot axis.

2. The device according to claim 1, wherein each welding and cutting means includes a blade extending past a respective plate.

3. The device according to claim 1, wherein each plate is mounted for rotation on respective drive shafts each extending transversely of the path, and wherein each plate extends radially of a respective drive shaft.

4. The device according to claim 1, wherein the transmission includes a control body mounted in a housing for translational movement in a direction perpendicular to the stem, and having an inclined abutment surface engaging an opposite end of the stem.

5. The device according to claim 4, wherein the transmission includes a manually turnable knob mounted on one end of an actuating shaft, a first bevel gear mounted on an opposite end of the actuating shaft, a second bevel gear meshing with said first bevel gear and connected to the control body, and a threaded element threadedly engaging the control body.

6. The device according to claim 5; and further comprising a position indicator for indicating the position of each lever.

7. The device according to claim 1, wherein the positioning means further includes an elongated piston having one end engaging the other of said sides of the second arm of each lever, a cylinder for receiving the piston, and means for feeding pressurized air to the cylinder for maintaining the piston at a selected pressure against said other side of the second arm of each lever.

8. The device according to claim 7; and further comprising a pressure indicator for indicating the pressure of the pressurized air.

9. The device according to claim 7; and further comprising a selectable control means for discontinuing the feeding of pressurized air to the cylinder, thereby allowing the stem to advance and the plates to be positioned at a maximum said spacing apart.

10. The device according to claim 9; and further comprising a control panel on which the selectable control means is mounted.

* * * * *